United States Patent
Laing

(10) Patent No.: US 10,352,317 B2
(45) Date of Patent: Jul. 16, 2019

(54) METHOD FOR DETERMINING A THROUGH-FLOW QUANTITY IN A FLUID DELIVERY SYSTEM, METHOD FOR DETERMINING AN AMOUNT OF ENERGY OF A DELIVERY FLUID, FLUID DELIVERY SYSTEM AND PUMP

(71) Applicant: Xylem IP Holdings LLC, White Plains, NY (US)

(72) Inventor: Oliver Laing, Herrenberg (DE)

(73) Assignee: XYLEM IP HOLDINGS LLC, White Plains, NY (US)

( * ) Notice: Subject to any disclaimer, the term of this patent is extended or adjusted under 35 U.S.C. 154(b) by 519 days.

(21) Appl. No.: 15/049,599

(22) Filed: Feb. 22, 2016

(65) Prior Publication Data
US 2016/0169220 A1    Jun. 16, 2016

Related U.S. Application Data

(63) Continuation of application No. PCT/EP2014/067725, filed on Aug. 20, 2014.

(30) Foreign Application Priority Data

Aug. 23, 2013    (DE) .......................... 10 2013 109 134

(51) Int. Cl.
*F04B 49/20* (2006.01)
*G01F 25/00* (2006.01)
(Continued)

(52) U.S. Cl.
CPC ............ *F04B 49/20* (2013.01); *F04D 27/004* (2013.01); *F24D 19/1006* (2013.01);
(Continued)

(58) Field of Classification Search
CPC . F04D 27/004; F04D 19/1006; F04D 19/1012
See application file for complete search history.

(56) References Cited

U.S. PATENT DOCUMENTS 4,856,965 A * 8/1989 Katsuie ..................... H02P 9/08
                                                                  417/19
5,563,490 A * 10/1996 Kawaguchi ......... F04D 15/0066
                                                                  318/808
(Continued)

FOREIGN PATENT DOCUMENTS

DE    3402120    7/1985
DE    3542370    6/1987
(Continued)

OTHER PUBLICATIONS

Buderus Catalog, pp. 15005-15014, dated 2003 (abstract only).
(Continued)

*Primary Examiner* — Patrick Hamo
(74) *Attorney, Agent, or Firm* — RatnerPrestia

(57) ABSTRACT

A method for determining a through-flow quantity in a fluid delivery system, in which a fluid is delivered by a pump, the pump including an electromotor and the electromotor being operated at a first speed when the electromotor is in operation and the through-flow quantity being determined from a measured motor power and the speed. The method includes (i) increasing the first speed to a second speed which is greater than the first speed; (ii) determining a second through-flow quantity at the second speed from the motor power and the second speed; (iii) determining a third through-flow quantity from the second through-flow quantity by extrapolation of the second speed to the first speed, wherein the third through-flow quantity is the target variable; and, (iv) reducing the speed back to the first speed once the second through-flow quantity has been determined.

18 Claims, 4 Drawing Sheets

(51) Int. Cl.
  *F24D 19/10*  (2006.01)
  *G01K 17/08*  (2006.01)
  *F04D 27/00*  (2006.01)
  *G01K 13/02*  (2006.01)

(52) U.S. Cl.
  CPC ..... *F24D 19/1012* (2013.01); *G01F 25/0007* (2013.01); *G01K 17/08* (2013.01); *F24D 2200/14* (2013.01); *G01K 2013/026* (2013.01); *Y02B 10/20* (2013.01); *Y02B 30/745* (2013.01)

(56) References Cited

U.S. PATENT DOCUMENTS

| | | | |
|---|---|---|---|
| 6,354,805 | B1 | 3/2002 | Moller |
| 6,464,464 | B2* | 10/2002 | Sabini ................ F04D 15/0066 318/432 |
| 7,815,420 | B2 | 10/2010 | Koehl |
| 7,874,808 | B2 | 1/2011 | Stiles |
| 7,945,411 | B2* | 5/2011 | Kernan ................ F04D 27/001 702/100 |
| 8,801,389 | B2* | 8/2014 | Stiles, Jr. ................ F04B 49/20 417/43 |
| 2009/0121034 | A1 | 5/2009 | Laing |
| 2010/0252029 | A1 | 10/2010 | Kanai |
| 2011/0076156 | A1 | 3/2011 | Stiles |
| 2013/0164149 | A1* | 6/2013 | Mehr ................ F04B 23/04 417/62 |

FOREIGN PATENT DOCUMENTS

| | | |
|---|---|---|
| DE | 19513394 | 10/1996 |
| DE | 19931961 | 2/2001 |
| DE | 10116339 | 10/2002 |
| DE | 10163987 | 7/2003 |
| DE | 10163989 | 7/2003 |
| DE | 102005037608 | 2/2007 |
| DE | 102006041346 | 3/2008 |
| DE | 102007054313 | 5/2009 |
| DE | 102009050083 | 4/2011 |
| DE | 102011008165 | 7/2012 |

OTHER PUBLICATIONS

Geregelte Heizungsumwalzpumpen, pp. 1-8, 1-9, dated 2009 (abstract only).

International Preliminary Report on Patentability and Written Opinion of the International Searching Authority for International Application No. PCT/ EP2014/067725 dated Feb. 23, 2016.

International Search Report for International Application No. PCT/ EP2014/067725 dated Nov. 20, 2014.

Neuberger, T., et al., "Variable frequency drives: energy savings for pumping applications," Nov. 1, 2012, pp. 1-4, Retrieved from the internet: URL:http://www.eaton.com/ecm/groups/public/@pub/@electric/documents/content/ia04008002e.pdf [retrieved on Nov. 7, 2014].

* cited by examiner

METHOD FOR DETERMINING A THROUGH-FLOW QUANTITY IN A FLUID DELIVERY SYSTEM, METHOD FOR DETERMINING AN AMOUNT OF ENERGY OF A DELIVERY FLUID, FLUID DELIVERY SYSTEM AND PUMP

CROSS-REFERENCE TO RELATED APPLICATIONS

This patent application is a continuation patent application of international application number PCT/EP2014/067725 filed on Aug. 20, 2014, which claims the benefit of German application number 10 2013 109 134.2 filed on Aug. 23, 2013, both of which are incorporated by reference in their entirety and for all purposes.

BACKGROUND OF THE INVENTION

The invention relates to a method for determining a through-flow quantity in a fluid delivery system, in which a fluid is delivered by a pump, the pump comprising an electromotor and the electromotor being operated at a first speed when said electromotor is in operation and the through-flow quantity being determined from a measured motor power and the speed.

The invention further relates to a method for determining an amount of energy of a delivery fluid in a fluid delivery system, in which the amount of energy is determined from a through-flow quantity in the fluid delivery system, a measured feed temperature and a measured return temperature.

Furthermore, the invention relates to a fluid delivery system, comprising a fluid conduit and at least one pump with an electromotor, wherein the pump comprises a control device.

The invention furthermore relates to a pump and in particular a circulating pump for delivering fluid, with an electromotor and a control device.

A circulating pump for a delivery fluid is known from DE 10 2007 054 313 A1, which is incorporated by reference, comprising an electromotor, which is electronically commutated, with a rotor, a stator and a motor circuit, and an impeller, which is connected non-rotatably to the rotor. The electromotor comprises an evaluation device, through which, depending on the speed of the rotor and/or the power consumption of the electromotor, a through-flow quantity of delivery fluid through the circulating pump is determinable, and at least one signal output is provided, at which a through-flow quantity signal and/or through-flow-quantity-dependent switching signal is providable by the circulating pump.

DE 34 02 120 A1, which is incorporated by reference, discloses a method and a device for controlling several operation parameters in connection with pumps and compressors.

DE 35 42 370 A1 and DE 101 16 339 A1, which are each incorporated by reference, disclose methods of operating a pump with variable frequency.

DE 199 31 961 A1, which is incorporated by reference, discloses a method for controlling the delivery quantity of a pump.

U.S. Pat. No. 7,815,420 B2, which is incorporated by reference, discloses a method and an apparatus for pump control systems using a pump controller than can perform a self-calibrating procedure.

U.S. Pat. No. 7,874,808 B2, which is incorporated by reference, discloses a variable speed pumping system.

US 2011/0076156 A1, which is incorporated by reference, discloses a pumping system for moving water of a swimming pool.

DE 101 63 989 A1 and DE 101 63 987 A1, which are each incorporated by reference, disclose methods for controlling a heating pump which is speed controlled.

DE 10 2006 041 346 A1, which is incorporated by reference, discloses a method for performing a pipe net analysis on a pipe net.

DE 10 2005 037 608 A1, which is incorporated by reference, discloses a method for controlling the temperature of a medium in a heating and/or cooling system.

DE 195 13 394 A1, which is incorporated by reference, discloses a method for performance controlling of an electrically operated pump.

DE 10 2011 008 165 A1, which is incorporated by reference, discloses a method for operating a pump in an hydraulic system.

SUMMARY OF THE INVENTION

A method is provided, by means of which the through-flow quantity may be determined simply and accurately using a fluid delivery system.

In accordance with an embodiment of the invention, the first speed is increased to a second speed which is greater than the first speed, a second through-flow quantity at the second speed is determined from the motor power and the second speed, a third through-flow quantity is determined from the second through-flow quantity by extrapolation of the second speed to the first speed, wherein the third through-flow quantity is the target variable and, once the second through-flow quantity has been determined, the speed is reduced back to the first speed.

In principle, the through-flow quantity can be determined from the motor power (the power consumed by the electromotor) and the speed. Thus, if the speed is known and the motor power at that speed is known, then the through-flow quantity can be determined thereby. In the case of low through-flow quantities, however, a systematic error has a significant effect; such a systematic error is caused for example by bearing friction and the intrinsic consumption of electrical and electronic components of the electromotor. The corresponding electrical power consumption of the electromotor includes a proportion which is "non-hydraulic". If, in the case of corresponding low through-flow quantities, this is then determined from the measured motor power and speed, the corresponding systematic error has a particular effect.

According to aspects of the invention, on the basis of the first speed, the speed of the electromotor (of the rotor of the electromotor) is increased to a second, higher speed. The second speed is then in particular a multiple of, such as for example twice, the first speed. At the second speed the motor power is determined, the second through-flow quantity being determined therefrom.

On the basis of the known variables of the first speed, the second speed and the through-flow quantity at the second speed, the third through-flow quantity is then calculated by extrapolation. Calculation starts from the known relationship between through-flow quantity and speed.

The third through-flow quantity is the target variable. A first through-flow quantity may be determined directly from the first speed and the motor power at the first speed. The third through-flow quantity results from improved determination of the actual through-flow quantity at the first speed, since the effect of the systematic error on determination of the third through-flow quantity is smaller than on "direct determination" of the first through-flow quantity.

Once the second through-flow quantity has been determined, the speed is reduced back to the first speed. Normal operation is continued, so to speak.

The method according to aspects of the invention can be simply implemented using the pump or a control device of the fluid delivery system. In particular, no mechanical modifications or the like are necessary.

In particular prior to increasing the speed it is checked whether a first through-flow quantity determined at the first speed from the motor power of the first speed is below a predetermined limit value and, if the check finds that the quantity is (has dropped) below the limit value, the speed is increased to the second speed. If, for example, the result of the check is that the quantity is not below the limit value, then this means that the effect of the systematic error is tolerated and no increase is necessary. If, on the other hand, the result of the check is that the quantity is below the limit value, then this means that the effect of the systematic error is no longer tolerated and an extrapolation is necessary.

In particular, the first speed is a nominal speed or operating speed for normal operation of the fluid delivery system.

The extrapolation is favourably a linear extrapolation. In the case in particular of an electronically commutated electromotor, there is a linear relationship between the through-flow quantity and the speed.

In one exemplary embodiment, the second speed is selected as a predetermined multiple of the first speed. For example, the second speed is twice the first speed. In particular, when the multiple (which does not necessarily have to be an integral multiple) is suitably selected, the relative effect of the systematic error on determination of the second through-flow quantity is small.

In particular, the second speed is selected such that the second through-flow quantity is above the limit value, to keep the relative effect of the systematic error small.

The increase to the second speed and the subsequent reduction in the speed favourably takes place over a time interval which is shorter than a response time for adjusting elements of the fluid delivery system which may affect the hydraulic resistance of the fluid delivery system. Such elements are for example thermostatic valves or mixing valves. Regular operation of the fluid delivery system is not "disturbed" thereby. During the measurement time for carrying out the method according to aspects of the invention, the hydraulic resistance of the fluid delivery system is not affected significantly, resulting in reliable determination.

It is favourable for a feed temperature and a return temperature of the delivery fluid to be measured prior to the increase in speed. If these variables are required, for example for determining an amount of energy, it is then ensured by measurement prior to increasing the speed that any effect on the temperature due to the increase in speed is not taken into account.

The fluid delivery system favourably comprises a fluid conduit and in particular a closed fluid conduit. In this way a system may be simply produced in which the hydraulic resistance does not change or changes only slowly.

In particular, the fluid delivery system does not comprise any actuators which change the hydraulic resistance of the fluid conduit. The method according to aspects of the invention can then be carried out.

In particular, the electromotor is electronically commutated and in particular comprises a permanent magnet rotor. This then results in a linear relationship between the through-flow quantity and speed, wherein at known speed the through-flow quantity can be calculated from a measured motor power (power consumption of the electromotor).

Provision may be made for the increasing step and/or a checking step to be performed chronologically repeatedly and in particular regularly or once in particular on installation or start of the pump. With repeated performance during normal operation, the through-flow quantity can be determined simply and reliably if needed. With one-off performance in particular, the corresponding data may in particular be used to calibrate the pump.

In particular, the increasing step and/or the checking step (above all on installation or start of the pump) is not carried out until a temperature threshold has been reached, in order, as it were, to perform the method in a "steady" state of the fluid delivery system.

It is favourable for calibration data to be determined and stored and in particular determined automatically. The method according to aspects of the invention may in this way be accurately performed. In particular the pump may be calibrated.

In one embodiment, a correction table is used for the effect of additives in the delivery fluid. Such additives are for example antifreeze in the delivery fluid. The correction table provides an optimised result.

In particular, the correction table has been stored on the pump or a control unit outside the pump or is made to be stored there. An optimised result can thereby be obtained.

An additional through-flow measuring device can also be provided, which provides data to the pump in particular for calibration thereof. It is in principle sufficient for the additional through-flow measuring device for example to provide the measurement results for example on installation or start of the pump. An optimised result may thereby obtained.

In particular, the fluid delivery system is a solar thermal system, in which delivery fluid is heated by solar radiation. In such a solar thermal system a closed conduit with fixed hydraulic resistance is generally produced.

According to an embodiment of the invention, with the above-stated method for determining an amount of energy the through-flow quantity is determined according to aspects of the invention as a third through-flow quantity. This allows simple and reliable determination of the amount of energy with minimal effect of a systematic error.

According to an embodiment of the invention, in the case of the above-mentioned fluid delivery system, the control device controls, in operation, the performance of the steps of increasing an operating speed to a second speed which is greater than the first speed, determining a second through-flow quantity at the second speed from the motor power of the second speed, determining a third through-flow quantity from the second through-flow quantity by extrapolation of the second speed to the first speed, wherein the third through-flow quantity is the target variable and, once the second through-flow quantity ($Q(n_2)$) has been determined, reducing the speed (n) back to the first speed ($n_1$).

The fluid delivery system according to aspects of the invention has the advantages already explained in relation to the method according to aspects of the invention.

In particular, the method according to aspects of the invention may be performed on the fluid delivery system according to aspects of the invention.

It is advantageous if the control device controls the step of checking whether a through-flow quantity determined at the first speed from the motor power and the first speed is below a predetermined limit value and of increasing the speed to the second speed if the check finds that the quantity has dropped below the limit value. It is then possible to decide, as required, whether the method according to aspects of the invention is to be performed or whether it is unnecessary.

In particular, the fluid delivery system takes the form of a solar thermal system with at least one solar collector, configured for the delivery fluid to flow through it.

According to aspects of the invention, a pump is provided, in which the control device controls, in operation, the steps of increasing a speed to a second speed which is greater than the first speed, determining a second through-flow quantity at the second speed from a motor power of the second speed, determining a third through-flow quantity from the second through-flow quantity by extrapolation of the second speed to the first speed, wherein the third through-flow quantity is the target variable, and, once the second through-flow quantity ($Q(n_2)$) has been determined, reducing the speed (n) back to the first speed ($n_1$).

The corresponding pump in particular comprises a signal output at which a determination signal is provided for the through-flow quantity. This is provided over a large range of the value of the through-flow quantity with minimal effect from a systematic error.

It is then correspondingly advantageous for the control device to perform the step of checking whether the through-flow quantity determined at the first speed from the motor power of the first speed is below a predetermined limit value and, if the check finds that the quantity is below the limit value, increasing the speed to the second speed.

The following description of preferred embodiments serves, in conjunction with the drawings, to explain the invention in greater detail.

DETAILED DESCRIPTION OF THE INVENTION

Figure 1:
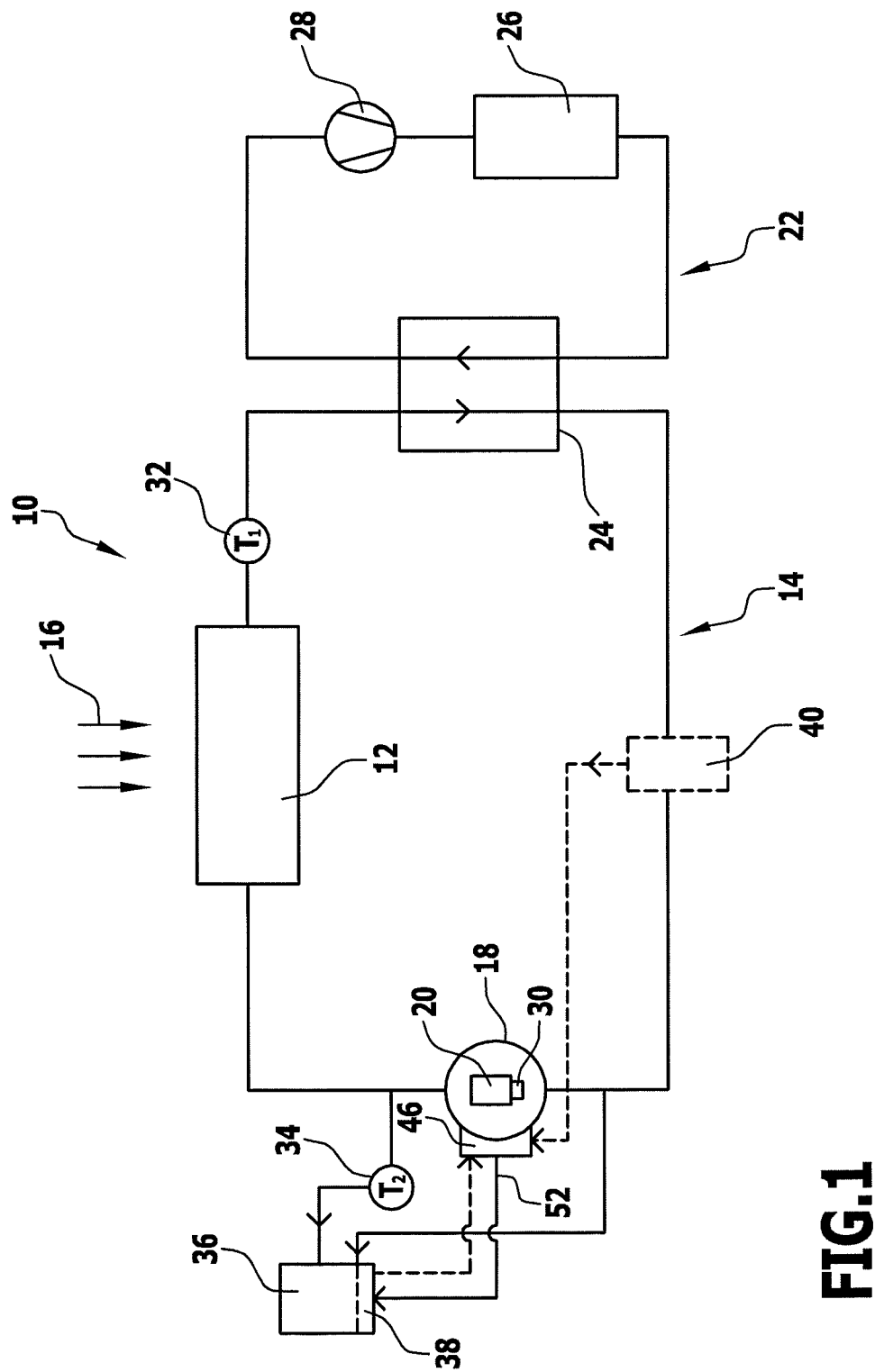
FIG. 1 is a schematic representation of an exemplary embodiment of a fluid delivery system.

An exemplary embodiment of a fluid delivery system, shown schematically in FIG. 1 and denoted 10 therein, is a solar thermal system. This solar thermal system comprises a solar collector device 12 with one or more solar collectors. The solar collector device 12 is coupled to a fluid conduit 14 for a delivery fluid and is flowed through by delivery fluid. The solar collector device 12 heats the delivery fluid by solar radiation 16.

The fluid conduit 14 is for example a closed conduit. The delivery fluid is for example a mixture of water and an antifreeze such as for example glycol.

The fluid delivery system 10 comprises a pump 18, which is arranged on the fluid conduit 14 and delivers the delivery fluid into the fluid conduit 14.

The pump 18 comprises an electromotor 20 with a rotor. The rotor is coupled non-rotatably to an impeller, in order to generate the corresponding hydraulic pressure for fluid delivery.

An exemplary embodiment of such a pump 18 is described below.

The delivery fluid in the fluid delivery system 10 is a heat-transfer medium. The fluid conduit 14 is coupled to a working conduit 22 via a heat exchanger 24. One or more consumers 26 are arranged in the working conduit 22. The working conduit 22 is for example a heating conduit or a service water conduit.

In one embodiment, the working conduit 22 comprises one or more pumps 28, for delivering fluid into the working conduit 22. The fluid delivered in the working conduit 22 is in particular water.

In principle, in the fluid conduit 14 the through-flow quantity may be determined by means of the pump 18 with the electromotor 20. The through-flow quantity is in particular proportional to the third root of a motor power P; the motor power P is the power consumption of the electromotor 20. The through-flow quantity Q is moreover proportional to the speed n of the electromotor 20, i.e. to the speed of an impeller of the pump 18, which in turn corresponds to the speed of a rotor of the electromotor 20. At a known and in particular predetermined speed n, it is then possible to determine the through-flow quantity Q by means of the measurable motor power P.

The electromotor 20 is in particular an electronically commutated electromotor. It comprises a permanent magnet rotor, for example. A plurality of windings are located on a stator. With such an electronically commutated electromotor, the motor power P can be determined directly at a corresponding control device.

At low speeds n, however, this determination of the through-flow quantity suffers from an elevated degree of inaccuracy; due to electrical influences, such as in particular the power consumption of the electronics of the electromotor 20, and due to bearing friction, the systematic error in determination of the through-flow quantity Q is significantly more relevant for small through-flow quantities Q. At small through-flow quantities the value derived from the motor power at a predetermined speed may differ widely from the actual through-flow quantity.

According to aspects of the invention, a method is provided in which, over a wide range of the through-flow quantity, the through-flow quantity is determinable very accurately (minimizing the effect of the systematic error) via the electromotor 20.

Figure 2:
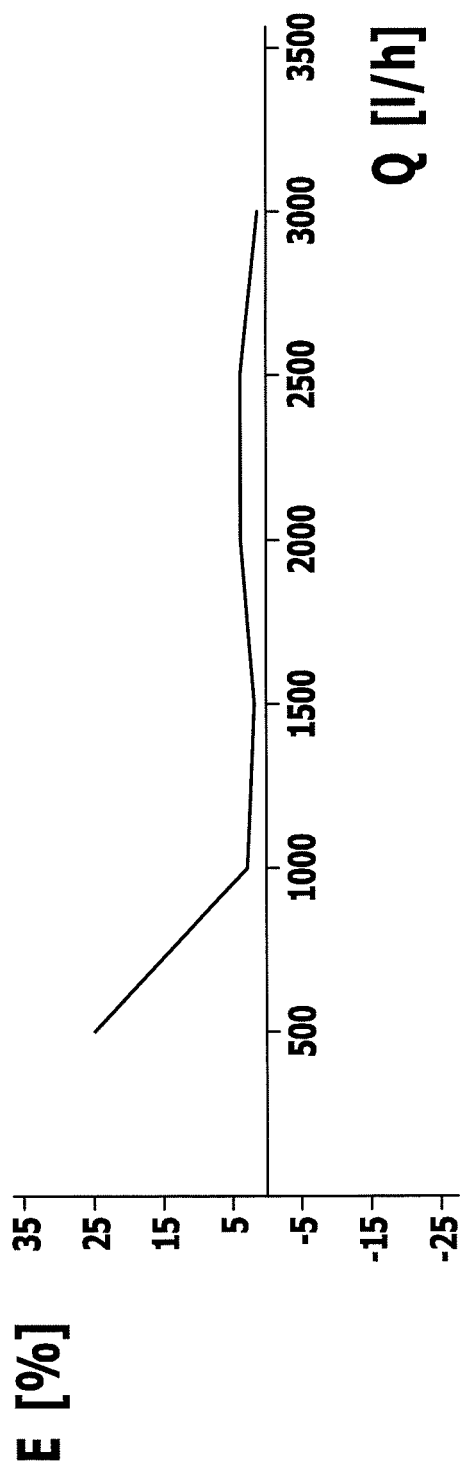
FIG. 2 is a schematic representation of a relative error in the determination of a through-flow quantity by means of an electromotor of a pump from motor power and speed.

The method proceeds as follows:

The electromotor 20 is operated at a first speed $n_1$. A first through-flow quantity $Q(n_1)$ is determined from the motor power P and the first speed $n_1$. It is then checked whether this through-flow quantity $Q(n_1)$ is above or below a limit value $Q_{lim}$. This limit value $Q_{lim}$ is set as a function of the desired accuracy. This predetermined limit value $Q_{lim}$ for the through-flow quantity is system-dependent. In the exemplary embodiment shown in FIG. 2, a $Q_{lim}$ value of 1500 l/h may be used.

If the check finds that the quantity has dropped below the limit value $Q_{lim}$, the speed is increased to a second speed $n_2$. This second speed $n_2$ is greater than the first speed $n_1$. It is for example double the first speed. The second speed $n_2$ is predetermined. Care is taken that at the speed $n_2$ the through-flow quantity is above $Q_{lim}$.

In principle, the increase may also take place without a prior checking step.

Then, at the speed $n_2$, a second through-flow quantity $Q(n_2)$ is determined from the motor power $P(n_2)$ and indeed the second speed $n_2$.

As mentioned above, the through-flow quantity is proportional to the speed.

The first speed $n_1$, the second speed $n_2$ and the through-flow quantity $Q(n_2)$ at the second speed $n_2$, are known from the described method.

Figure 3:
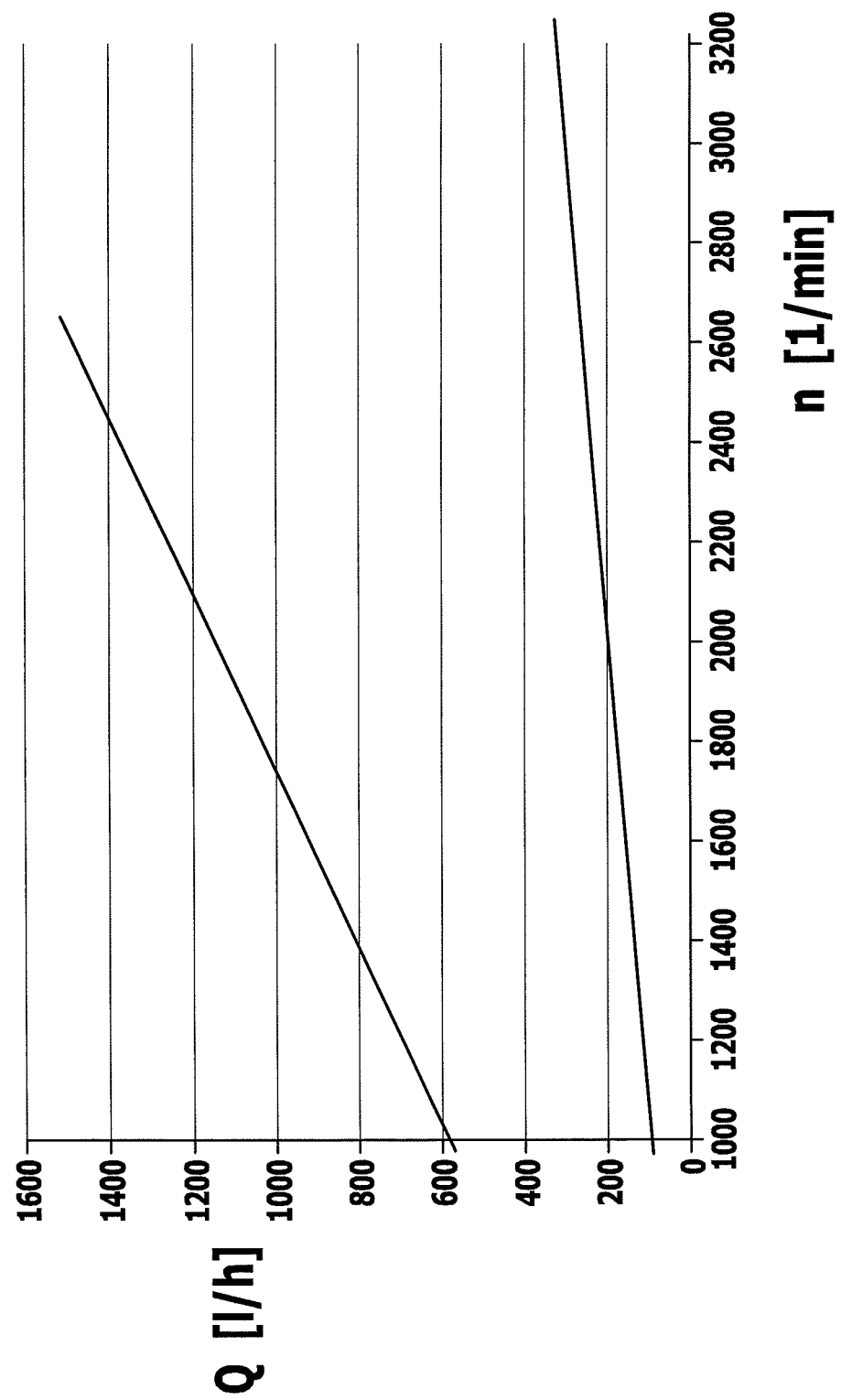
FIG. 3 shows schematically the relationship between through-flow quantity Q and speed n for two different pumps.
Figure 4:
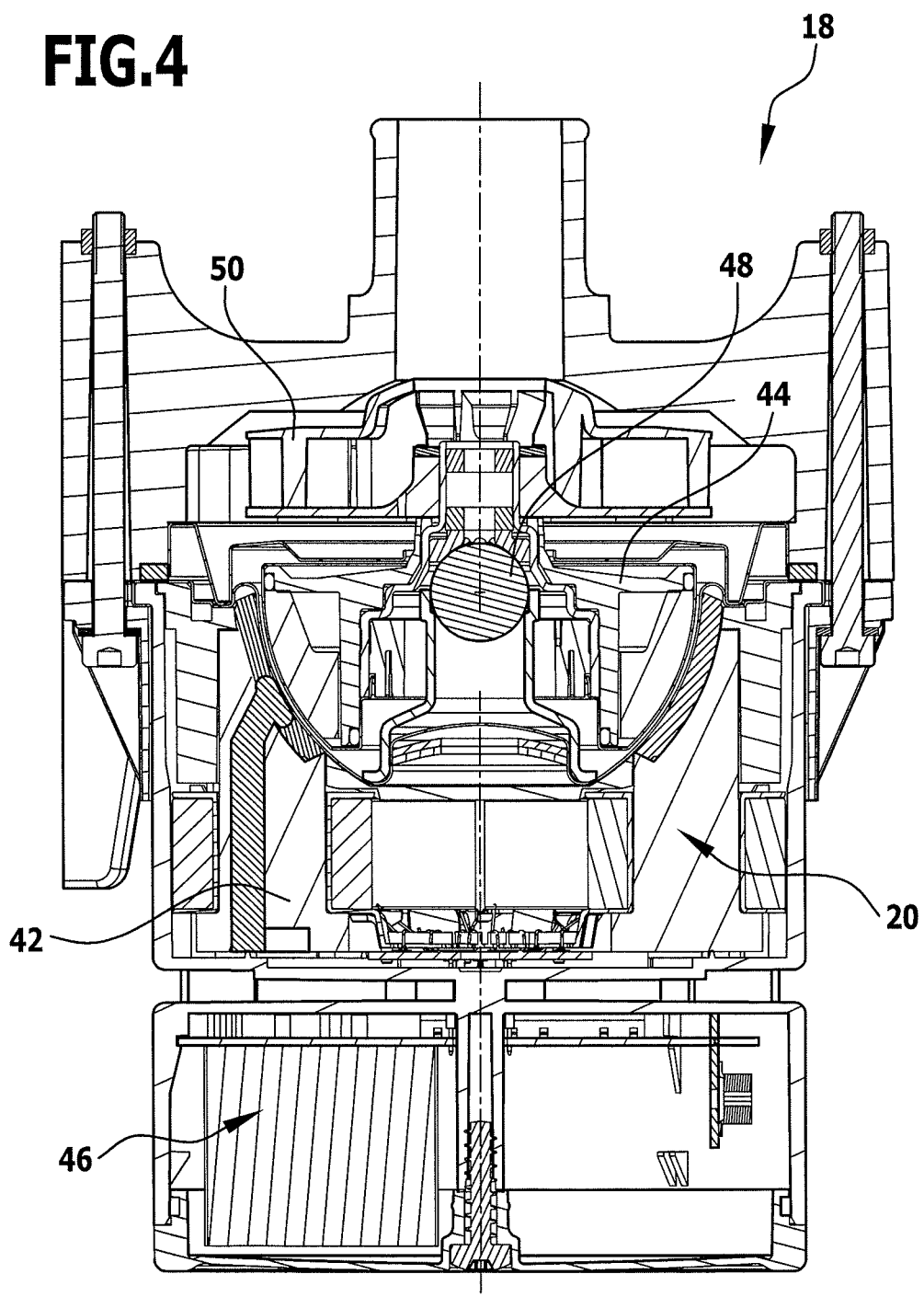
FIG. 4 is a sectional view of an exemplary embodiment of a pump according to aspects of the invention.

FIG. 3 shows the linear relationship for various pumps between the through-flow quantity and the speed. The specific profile (intercept, gradient) is different for different pumps.

From the known values of $n_1$, $n_2$ and $Q(n_2)$, it is then possible to determine a third through-flow quantity $Q^*(n_1)$ by linear extrapolation in accordance with the curves according to FIG. 3. The third through-flow quantity $Q^*(n_1)$ is calculated by "downward" extrapolation of the through-flow quantity $Q(n_2)$ to the first speed $n_1$.

The third through-flow quantity $Q^*(n_1)$ is a calculated value for the through-flow quantity at the first speed. It corresponds in principle to the first through-flow quantity $Q(n_1)$, wherein the relative effect of the systematic error for the third through-flow quantity $Q^*(n_1)$ is considerably lower than for the first through-flow quantity $Q(n_1)$.

The third through-flow quantity $Q^*(n_1)$ thus determined is then the target variable for the through-flow quantity to be determined at the first speed $n_1$.

Once the second through-flow quantity $Q(n_2)$ has been determined, the speed is reset to the speed $n_1$, i.e. the electromotor 20 is again operated at its nominal speed for the fluid delivery system 10.

A corresponding control device 30 with evaluation device is associated with the electromotor 20. This control device 30 ensures in particular automatic performance of the described method.

In principle, the increase from the first speed $n_1$ to the second speed $n_2$ and then the re-reduction of the speed is performed over such a time interval that a response time for adjusting elements of the fluid delivery system 10 (in particular mixing valves and thermostats) is considerably greater than the corresponding time interval. In this way, the increase in the speed to eliminate systematic errors in the determination of the through-flow quantity does not affect or does not significantly affect the hydraulic resistance in the fluid delivery system 10.

In particular, the fluid delivery system 10 does not comprise any actuators which increase a hydraulic resistance of the fluid conduit 14 or increase it at least over a comparable time over which the increase and reduction of the speed take place.

The fluid delivery system 10 comprises (at least) a first temperature sensor 32. This first temperature sensor 32 measures a fluid return temperature $T_1$.

Moreover, a second temperature sensor 34 is provided. This measures a fluid feed temperature. The fluid feed temperature $T_2$ corresponds substantially to the temperature of the fluid prior to passage through the solar collector device 12. The temperature $T_1$ corresponds to the temperature after passage through the solar collector device 12.

If the through-flow quantity is known and the temperatures $T_1$ and $T_2$ are known, then the amount of energy which is present in the delivery fluid may be determined.

The first temperature sensor 32 and second temperature sensor 34 supply their temperature data to a control device 36. The pump 18 with the electromotor 20 also supplies its data for the determined through-flow quantity to the control device 36, such that the amount of energy can be calculated therein.

Provision may then be made for a correction table 38 to be used, which takes account of the effect of additives in the delivery fluid. The correction table 38 may be stored in the control device 36 or in the control device 30 of the electromotor 20.

If the correction table 38 has been stored in the control device 36, then corresponding data are supplied to the control device 30 of the electromotor 20, in order to take account of this on calibration prior to through-flow quantity determination.

In one exemplary embodiment, in particular a temporary through-flow measuring device 40 is arranged in the fluid conduit 14. The through-flow measuring device 40 provides measured through-flow values independently of the pump 18 with electromotor 20. These measured values are then supplied to the pump 18 with electromotor 20 directly or via the control device 36 for calibration.

Determining the through-flow quantity using the method according to aspects of the invention may proceed for example in operation chronologically repeatedly and for example regularly. It may also take place once for example on installation or start of the pump 18. In particular, determination is only carried out when a temperature threshold has been reached and in particular the temperature threshold has been exceeded.

If calibration data have been determined, an automatic calibration of the pump 18 is performed in particular.

Using the first temperature sensor 32 and the second temperature sensor 34, in particular the temperatures are measured before the speed is increased from $n_1$ to $n_2$, such that any effect on this temperature by this change in speed is not detected.

The control device 30 of the electromotor 20 provides the motor power P and the speed n as measured variables. It is advantageous if an algorithm is implemented in the control device 30 which then calculates the through-flow quantity Q. In this way, the pump 18 then provides this variable for example to the control device 36 via a corresponding output and/or via an interface.

It is alternatively also possible for the pump 18 to provide the measured motor power P and the measured speed n via the control device 30 and to provide these data via a corresponding interface to the control device 36, this then calculating the through-flow quantity.

It is then furthermore advantageous for an algorithm for carrying out the above-described method, i.e. increasing the speed, determining the through-flow quantity at the raised speed and extrapolating to the through-flow quantity at the output speed including any possible checking step which checks whether the through-flow quantity determined from the motor power and the output speed is below a limit value, and reducing speed, to be implemented in the control device 30. Alternatively this algorithm may be implemented in the control device 36. This then sends corresponding control signals to the control device 30, to drive the electromotor 20 appropriately, i.e. to increase the speed and then reduce it again.

The method according to aspects of the invention may in principle be carried out using pumps of conventional mechanical and electrical structure.

An exemplary embodiment of a corresponding pump 18 is known for example from DE 10 2007 054 313 A1 or US 2009/0121034, which are each incorporated by reference.

Incorporation by reference is made to these documents in their entirety and for all purposes.

This pump 18 comprises the electromotor 20 with a stator 42 and a rotor 44. The electromotor 20 furthermore comprises a motor circuit 46. This motor circuit 46 comprises the control device 30, wherein the control device 30 in turn comprises an evaluation device for determining the through-flow quantity.

The rotor 44 is mounted rotatably on a convex bearing body 48. An impeller 50 is connected to rotate with to the rotor.

The electromotor 20 is electronically commutated. The rotor 44 comprises permanent magnets.

The control device 30 comprises at least one processor, which is a processor of the motor circuit 46. The evaluation device additionally comprises a memory device. This is integrated into the processor, for example. The memory device may also have one or more memory components.

As described above, the evaluation device and thus the control device 30 provides through-flow quantity signals for the delivery fluid which can be tapped at a signal output via a corresponding terminal 52 (cf. FIG. 1). The pump 18 has an interface for signal tapping via the electromotor 20.

In an alternative embodiment this interface serves to provide corresponding measured variables to the control device 36.

In an electronically commutated electromotor 20 there is a correlation between electrical power consumption and hydraulic power. In this way, it is possible to determine the through-flow quantity from motor data by means of the evaluation device, which is integrated into the pump 18 (which is a circulating pump), without an external sensor having to be provided to determine the through-flow quantity. The pump 18 may provide the corresponding signal via the terminal 52.

In the solution according to aspects of the invention, the through-flow quantity may be determined over a large range of values with minimized systematic error. Even at low nominal speeds or low operating speeds, at which the systematic error is per se great, error-minimized through-flow quantity determination can be performed. In the method according to aspects of the invention, the procedure is such that measurement at a high speed is carried out over a range of the through-flow quantity in which the systematic error which arises at low through-flow quantities and is attributable to bearing friction and the like has considerably less relative effect. The second through-flow quantity $Q(n_2)$ is there determined as an auxiliary variable and then the third through-flow quantity $Q^*(n_1)$ is determined by extrapolation by means of the measured variables $n_1$ and the known variables $n_2$ and $Q(n_2)$ and the linear relationship between the through-flow quantity and the speed.

The method according to aspects of the invention increases the accuracy of through-flow quantity determination. The method may also be used advantageously for calibration of the pump 18.

The method according to aspects of the invention can be implemented in principle without modification to the mechanical and electrical structure of a pump 18. It can be implemented as an algorithm in the control device 30.

The method according to aspects of the invention can be used advantageously in a solar thermal system.

LIST OF REFERENCE SIGNS

10 Fluid delivery system
12 Solar collector device
14 Fluid conduit
16 Solar radiation
18 Pump
20 Electromotor
22 Working conduit
24 Heat exchanger
26 Consumer
28 Pump
30 Control device
32 First temperature sensor
34 Second temperature sensor
36 Control device
38 Correction table
40 Through-flow measuring device
42 Stator
44 Rotor
46 Motor circuit
48 Bearing body
50 Impeller
52 Terminal

What is claimed is:

1. A method for determining a through-flow quantity in a fluid delivery system, the method comprising:
    delivering fluid through the system using a pump comprising an electromotor;
    operating the electromotor at a first speed;
    determining a first through-flow quantity from a measured motor power and the first speed,
    checking, prior to increasing the speed, whether the first through-flow quantity determined at the first speed from the motor power and the first speed is below a predetermined limit value and, if the check finds that the quantity is below the limit value, increasing the speed to a second speed;
    increasing the first speed to the second speed which is greater than the first speed;
    determining a second through-flow quantity at the second speed from the measured motor power and the second speed;
    determining a third through-flow quantity from the second through-flow quantity by extrapolation of the second speed to the first speed, wherein the third through-flow quantity is a target variable; and,
    reducing the speed back to the first speed once the second through-flow quantity has been determined.

2. The method according to claim 1, wherein the first speed is a nominal speed for normal operation of the fluid delivery system.

3. The method according to claim 1, wherein the extrapolation is a linear extrapolation.

4. The method according to claim 1, wherein the second speed is selected as a predetermined multiple of the first speed.

5. The method according to claim 1, wherein the second speed is selected such that the second through-flow quantity is above the limit value.

6. A method for determining a through-flow quantity in a fluid delivery system, the method comprising:
    delivering fluid through the system using a pump comprising an electromotor;
    operating the electromotor at a first speed;
    determining a first through-flow quantity from a measured motor power and the first speed;
    increasing the first speed to a second speed which is greater than the first speed;

determining a second through-flow quantity at the second speed from the measured motor power and the second speed;

determining a third through-flow quantity from the second through-flow quantity by extrapolation of the second speed to the first speed, wherein the third through-flow quantity is a target variable; and, reducing the speed back to the first speed once the second through-flow quantity has been determined, wherein the increase to the second speed and the following reduction in speed takes place over a time interval which is shorter than a response time for adjustment of elements of the fluid delivery system which affect a hydraulic resistance in the fluid delivery system.

7. The method according to claim 1, wherein a feed temperature and a return temperature are measured prior to the increase in speed.

8. The method according to claim 1, wherein the fluid delivery system comprises a closed fluid conduit.

9. The method according to claim 8, wherein the fluid delivery system does not comprise any actuators which change a hydraulic resistance of the fluid conduit.

10. The method according to claim 1, wherein the electromotor is electronically commutated and comprises a permanent magnet rotor.

11. The method according to claim 1, wherein at least one of the increasing step and a checking step are performed chronologically repeatedly and either regularly or once on either installation or start of the pump.

12. The method according to claim 11, wherein at least one of the increasing step and the checking step is not carried out until a temperature threshold is reached.

13. The method according to claim 11, wherein calibration data are determined and stored and determined automatically.

14. A method for determining a through-flow quantity in a fluid delivery system, the method comprising:

delivering fluid through the system using a pump comprising an electromotor;

operating the electromotor at a first speed;

determining a first through-flow quantity from a measured motor power and the first speed;

increasing the first speed to a second speed which is greater than the first speed;

determining a second through-flow quantity at the second speed from the measured motor power and the second speed;

determining a third through-flow quantity from the second through-flow quantity by extrapolation of the second speed to the first speed, wherein the third through-flow quantity is a target variable;

reducing the speed back to the first speed once the second through-flow quantity has been determined; and determining an effect of additives in the delivery fluid using a correction table.

15. The method according to claim 14, wherein the correction table has been or is stored on the pump or a control unit outside the pump.

16. The method according to claim 1, wherein an additional through-flow measuring device provides data to the pump for calibration thereof.

17. The method according to claim 1, wherein the fluid delivery system is a solar thermal system, in which delivery fluid is heated by solar radiation.

18. A method for determining an amount of energy of a delivery fluid in a fluid delivery system, the method comprising:

delivering fluid through the fluid delivery system using a pump comprising an electromotor;

operating the electromotor at a first speed;

determining a first through-flow quantity from a measured motor power and the first speed;

checking, prior to increasing the speed, whether the first through-flow quantity determined at the first speed from the motor power and the first speed is below a predetermined limit value and, if the check finds that the quantity is below the limit value, increasing the speed to a second speed;

increasing the first speed to the second speed which is greater than the first speed;

determining a second through-flow quantity at the second speed from the motor power and the second speed;

determining the third through-flow quantity from the second through-flow quantity by extrapolation of the second speed to the first speed;

determining the amount of energy of the delivery fluid in the fluid delivery system from the third through-flow quantity in the fluid delivery system, a measured feed temperature and a measured return temperature; and reducing the speed back to the first speed once the second through-flow quantity has been determined.

* * * * *